US009106871B2

(12) United States Patent
Rowe

(10) Patent No.: US 9,106,871 B2
(45) Date of Patent: Aug. 11, 2015

(54) DETECTING WHICH CHANNEL A LOCAL STB IS DISPLAYING USING A LOCAL TUNER

(75) Inventor: Simon Michael Rowe, Finchampstead (GB)

(73) Assignee: GOOGLE INC., Mountain View, CA (US)

( * ) Notice: Subject to any disclaimer, the term of this patent is extended or adjusted under 35 U.S.C. 154(b) by 220 days.

(21) Appl. No.: 13/171,239

(22) Filed: Jun. 28, 2011

(65) Prior Publication Data
US 2015/0193451 A1    Jul. 9, 2015

Related U.S. Application Data

(60) Provisional application No. 61/470,615, filed on Apr. 1, 2011.

(51) Int. Cl.
*H04N 5/445*   (2011.01)
*H04N 21/462*  (2011.01)

(52) U.S. Cl.
CPC ............ *H04N 5/445* (2013.01); *H04N 21/462* (2013.01)

(58) Field of Classification Search
USPC ............................................. 348/461; 725/59
See application file for complete search history.

(56) References Cited

U.S. PATENT DOCUMENTS

| 6,772,434 | B1 * | 8/2004 | Godwin | 725/68 |
| 2007/0271300 | A1 * | 11/2007 | Ramaswamy | 707/104.1 |
| 2008/0059999 | A1 * | 3/2008 | Winans et al. | 725/34 |
| 2009/0077049 | A1 * | 3/2009 | Seet et al. | 707/4 |

\* cited by examiner

*Primary Examiner* — Michael Tietelbaum
(74) *Attorney, Agent, or Firm* — Morgan, Lewis & Bockius LLP

(57) ABSTRACT

Methods and systems for determining meta-information for a channel being viewed are described. At an inline TV processor with a processor and memory, a first TV signal is received from a first source. One or more fingerprints are generated from the first TV signal. A plurality of second TV signals are received from a second source, and one or more respective second fingerprints are generated for each of the second TV signals. It is then determined whether one of the first fingerprints matches one of the second fingerprints. In response to determining that one of the first fingerprints matches a respective one of the second fingerprints, meta-information of the second TV signal (that is associated with the matched respective second fingerprint) is associated with the first TV signal. In response to determining that one of the first fingerprints does not match any of the second fingerprints, the steps are repeated.

11 Claims, 6 Drawing Sheets

DETECTING WHICH CHANNEL A LOCAL STB IS DISPLAYING USING A LOCAL TUNER

RELATED APPLICATIONS

This application claims priority to U.S. Provisional Application Ser. No. 61/470,615, filed Apr. 1, 2011, entitled "Detecting Which Channel a Local STB is Displaying Using a Local Tuner", which is incorporated by reference herein in its entirety.

TECHNICAL FIELD

The present invention relates generally to detecting channel information.

BACKGROUND

Television content is delivered to users in many different ways, and in many different formats. For example, a user may subscribe to a cable or satellite television service to access high definition or alternative language versions of certain channels. While cable or satellite receivers may be able to identify the channel that a user is watching, such receivers often do not send this information to the television or other media devices. Often, they send only a bare TV signal without channel information, so that other devices do not know what channel is being viewed. In some cases, televisions or other media devices may benefit from having access to channel information of the viewed channel in order to customize a user experience based at least in part on that information.

Accordingly, it is highly desirable to provide systems and methods to determine what channel a user is viewing, even when the TV signal does not contain any channel information.

SUMMARY

The above deficiencies and other problems associated with determining what channel a user is viewing based on a bare TV signal are reduced or eliminated by the disclosed methods and devices.

Methods and systems for detecting a channel being displayed on a device are described. Such methods and systems provide an effective way for an inline TV processor to provide tailored content to viewers. Some implementations provide an inline TV processor. At the inline TV processor, a first TV signal is received from a first source, and one or more first fingerprints are generated from the first TV signal. The first TV signal corresponds to a TV channel that is being viewed on a display device. A plurality of second TV signals is received, and one or more second fingerprints are generated for each of the second TV signals. It is determined whether one of the first fingerprints matches one of the second fingerprints. When a match is found, the meta-information associated with the matching second TV signal is associated with the first TV signal.

In accordance with some implementations, at the inline TV processor, one or more additional first fingerprints are generated from the first TV signal, and one or more additional second fingerprints are generated from the respective second TV signal. It is determined whether one of the additional first fingerprints matches one of the additional second fingerprints. When no match between the additional first and second fingerprints is found, the steps for determining meta-information for a channel being viewed are repeated. When a match between the additional first and second fingerprints is found, the determination of whether one of the additional first fingerprints matches one of the additional second fingerprints is repeated in order to determine if the first TV signal has been changed. In some implementations, the comparisons are repeated at predetermined intervals.

BRIEF DESCRIPTION OF THE DRAWINGS

Like reference numerals refer to corresponding parts throughout the drawings.

DETAILED DESCRIPTION

Figure 1:
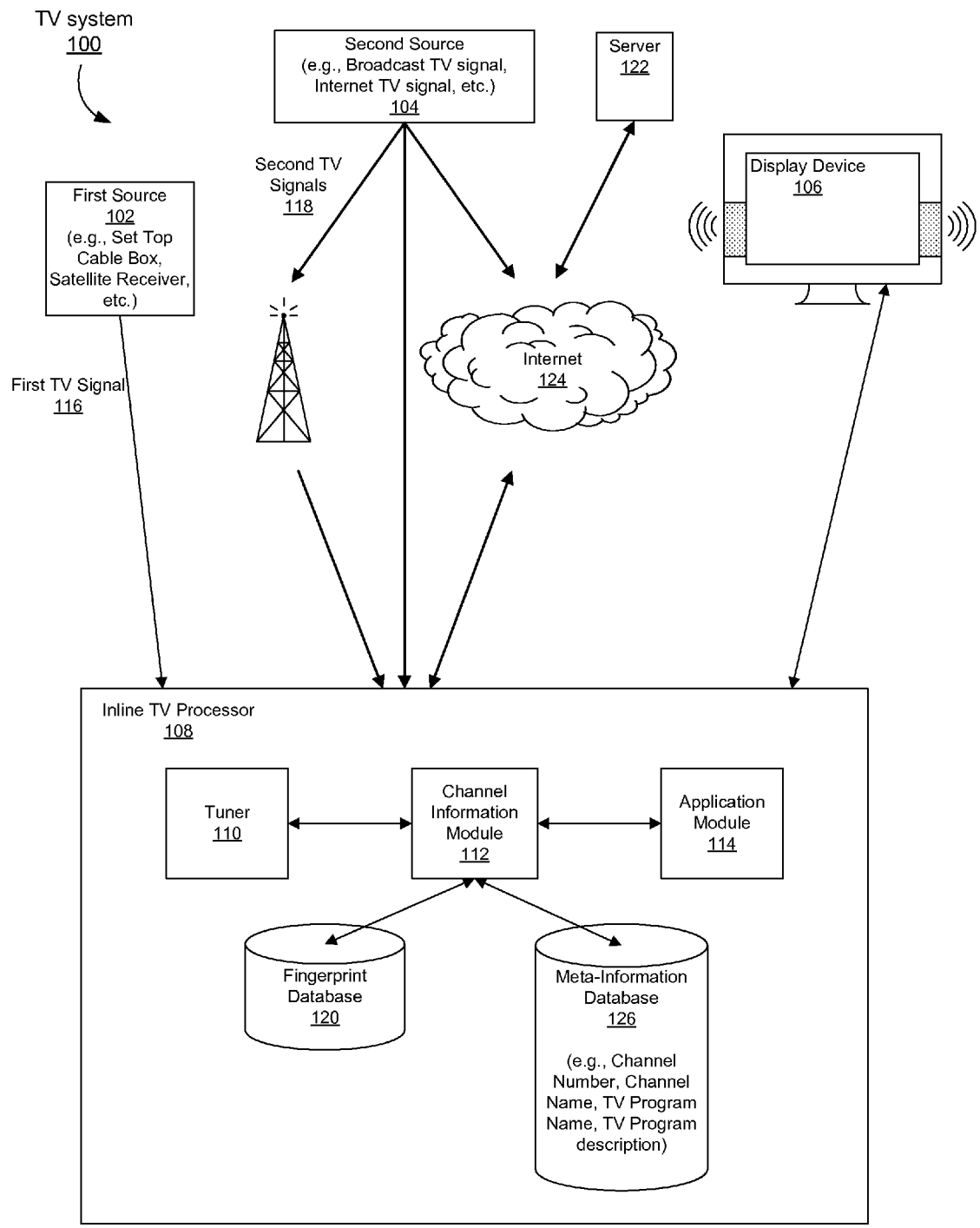
FIG. 1 is a block diagram illustrating the infrastructure of a TV system, in accordance with some implementations.

Attention is directed to FIG. 1 which is a block diagram illustrating the functional components of a TV system 100 in accordance with some implementations. The TV system 100 includes: a first source 102, a second source 104, a display device 106, an inline TV processor 108, and a server 122.

It should be appreciated that the TV system 100 can be implemented as separate components or as parts of a single component. For convenience of illustration and explanation, the TV system 100 is described below as being implemented as separate components.

The first source 102 is a source of a first TV signal 116. The first TV signal 116 can be any signal that carries TV content. As used herein, a TV signal is an electrical, optical, or other type of data transmitting medium that includes audio and/or video components corresponding to a TV channel. Audio and video components of TV signals are sometimes referred to herein as audio signals and video signals.

In some implementations, the first TV signal 116 carries video and audio content for presentation on a display device. In some implementations, the first source 102 is a traditional set top box. A set top box is used herein to describe TV components that receive, decode, and/or otherwise provide a TV signal for presentation on the display device. For example, the first source 102 can be a set top box for receiving cable TV and/or satellite TV, a digital video recorder (DVR), a digital media receiver, a TV tuner, a computer, and/or any other device that outputs TV signals. In some implementations, the first source 102 is an output from the display device 106, for example, a when the first source 102 is first routed to the display device 106.

In some implementations, the first TV signal 116 carries information for audible sound corresponding to an audio track on a TV channel. In some implementations, the audible sound is produced by speakers associated with the display device 106, and is received by a receiver (e.g., a microphone) in the inline TV processor 108. These implementations are described in greater detail herein with reference to FIG. 2A.

In some implementations, the first TV signal 116 corresponds to a TV channel that is being displayed on the display device 106. In some implementations, the first TV signal 116 does not contain any channel information indicating the channel being viewed by a user. For example, the first TV signal 116 may only contain bare video and/or audio components of a TV signal, such that a device receiving the first TV signal 116 cannot decipher or identify the numerical TV channel associated with the first TV signal 116.

The second source 104 is a source of second TV signals 118. In some implementations, the second source 104 is a terrestrial over-the-air TV broadcast. In some implementations, the second source 104 is an internet TV source. The second source 104 provides to the inline TV processor 108 a signal or signals corresponding to a plurality of TV channels. In some implementations, a TV signal corresponding to a single TV channel is transmitted over the air on a single frequency. In some implementations, multiple TV signals corresponding to multiple TV channels are transmitted over a single frequency using multiplexing techniques.

The display device 106 can be any display for presenting video and/or audio content to a user. In some implementations, the display device 106 is a television. In some implementations, the display device 106 can be a computer monitor, LCD screen, tablet computer, mobile telephone, projector, and/or any other type of video display system. In some implementations, the inline TV processor 108 is connected to the display device 106. In some implementations, the display device 106 includes the inline TV processor 108. Stated in another way, in some implementations, the inline TV processor and the display device are contained in a single device. In some implementations, the display device 106 includes, or is otherwise connected to, speakers capable of producing an audible stream corresponding to the audio component of a TV signal.

In some implementations, the inline TV processor 108 includes a tuner 110 that is capable of receiving over-the-air TV signals. In some implementations, the tuner 110 receives other types of TV signals, such as cable, satellite, and/or internet TV signals. In some implementations, the tuner 110 is configured to receive analog and/or digital TV broadcasts.

In some implementations, the content or information of the first TV signal 116 is the same as the content or information of one of the second TV signals 118. For example, in some implementations, the first TV signal 116 corresponds to a particular TV channel, and one of the second TV signals 118 corresponds to that same TV channel. In some implementations, the first TV signal 116 and one of the second TV signals 118 are high- and low-resolution versions, respectively, of the same content or information. In some implementations, they are high- and low-resolution versions of the same TV channel. In some implementations, the first TV signal 116 has a high-resolution video component (e.g., 720p, 1080i, and/or 1080p), and the corresponding second TV signals 118 have lower resolution video components (e.g., 480i).

In some implementations, the inline TV processor 108 includes a channel information module 112. As discussed in greater detail herein, the channel information module 112 identifies the TV channel associated with the first TV signal 116. In some implementations, the inline TV processor 108 creates fingerprints for the first TV signal 116 and the each of the second TV signals 118, discussed in greater detail herein. In some implementations, fingerprints are stored in the fingerprint database 120.

In some implementations, the inline TV processor 108 includes an application module 114. Implementations of the application module 114 and applications are discussed in greater detail herein.

In some implementations, the server 122 receives meta-information identified by the inline TV processor 108 (e.g., the TV channel associated with the first TV signal 116), and returns to the inline TV processor 108 digital content including applications, media files, program information/metadata, and/or advertising associated with the TV channel. In some implementations, the meta-information is stored in the meta-information database 126. Meta-information and the meta-information database 126 are discussed in greater detail herein.

Although FIG. 1 shows discrete components, FIG. 1 is intended more as functional description of the various features which may be present in a set of devices than as a structural schematic of the implementations described herein. In practice, and as recognized by those of ordinary skill in the art, items shown separately could be combined and some items could be separated. For example, some items (e.g., first source 102 and inline TV processor 108) shown separately in FIG. 1 could be implemented on the display device 106. Alternatively, single items could be implemented by one or more devices. The actual number of devices used to implement the TV system 100, and how features are allocated among them, will vary from one implementation to another.

Figure 2A:
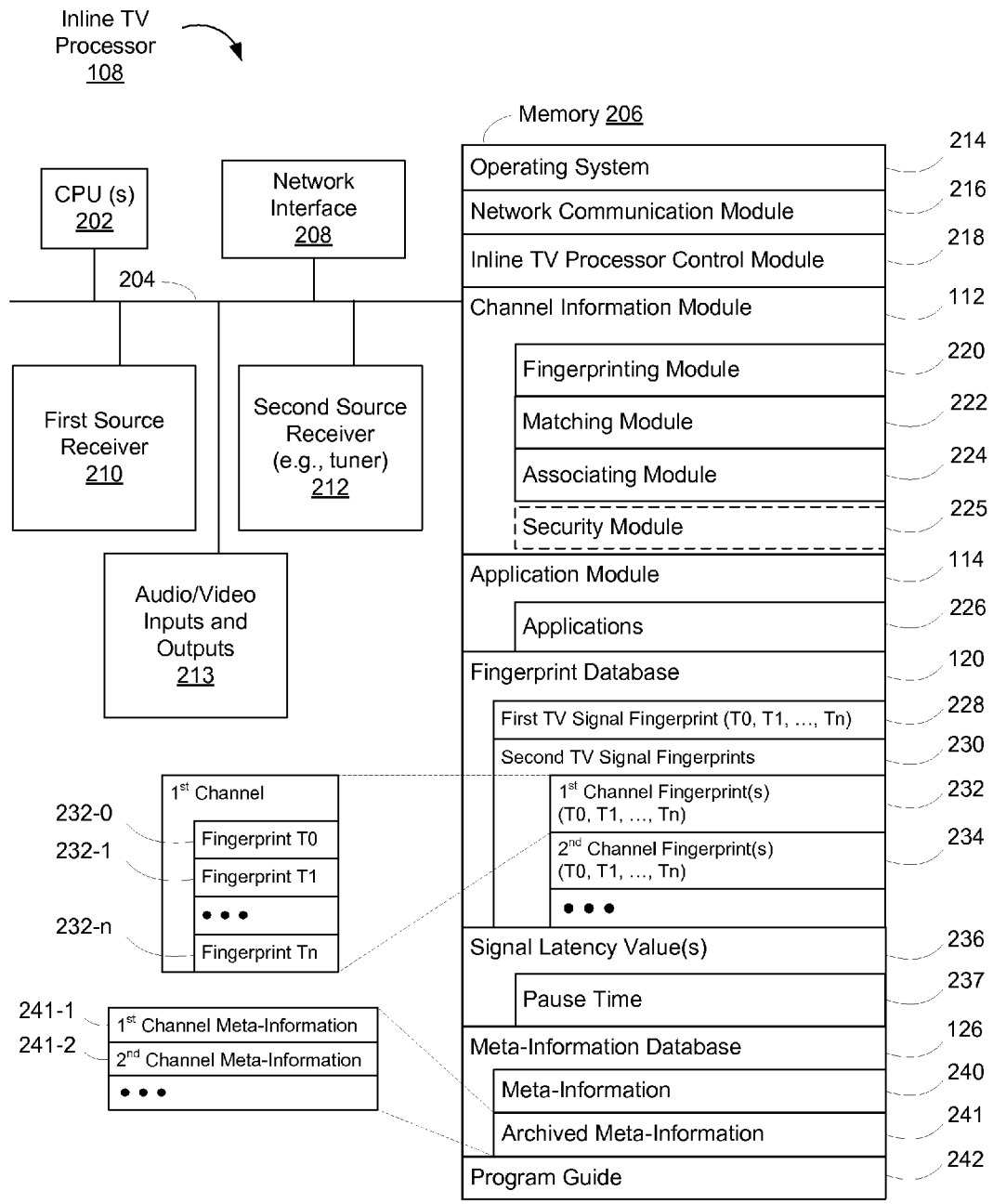
FIG. 2A is a block diagram illustrating the structure of an exemplary inline TV processor, in accordance with some implementations.

FIG. 2A is a block diagram illustrating one implementation of an inline TV processor 108. The inline TV processor 108 is an electronic device that typically includes one or more processing units (CPU(s)) 202, one or more network or other communications interfaces 208, memory 206, a first source receiver 210, a second source receiver 212, audio/video inputs and outputs 213, and one or more communication buses 204 for interconnecting these components.

In some implementations, the first source receiver 210 is configured to receive the first TV signal 116. In some implementations, the first source receiver 210 is a video and/or audio interface for connecting to the first source 102. In some implementations, the first source 102 is connected to the first source receiver 210 by a physical connection, such as an electrical or optical audio/video cable. Such audio/video cables include HDMI cables, coaxial cables, VGA cables, optical cables, and/or any other cable configured to transmit audio/video signals between devices. In some implementations, the first source receiver 210 receives a first TV signal 116 by a wireless connection. In some implementations, the first source receiver 210 is a microphone, transducer, and/or an audio-pickup device for receiving an audible stream (e.g., the sound track of a TV program or movie).

In some implementations, the second source receiver 212 includes a tuner 110 for receiving over-the-air TV signals. In some implementations, the second source receiver 212 includes a tuner or other device that is configured to receive internet, satellite, or cable TV signals.

The audio/video inputs and outputs 213 are physical interfaces for establishing connections between various components or devices of the TV system 100. For example, in some implementations, the audio/video inputs and outputs 213 include connectors for HDMI cables, coaxial cables, VGA cables, optical cables, and the like. In some implementations, the audio/video inputs and outputs 213 enable a physical interface between the inline TV processor 108, the first source 102, the second source 104, and the display device 106.

The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, including the non-volatile and volatile memory device(s) within the memory 206, comprises a computer readable storage medium. In some implementations, the memory 206 or the non-transitory computer readable storage medium of the memory 206 stores the following programs, modules and data structures, or a subset thereof including an operating system 214, a network communication module 216, an inline TV processor control module 218, a channel information module 112, an application module 114, a fingerprint database 120, a signal latency value 236, and the meta-information database 126.

The operating system 214 includes procedures for handling various basic system services and for performing hardware dependent tasks.

The network communication module 216 facilitates communication with other devices via the one or more communication network interfaces 208 (wired or wireless) and one or more communication networks, such as the Internet 124, other wide area networks, local area networks, metropolitan area networks, and so on.

The inline TV processor control module 218 includes procedures for controlling the first source receiver 210 and the second source receiver 212.

The channel information module 112 processes the first TV signal 116 and the Second TV signals 118 to identify what TV channel is active on the first TV signal 116. In some implementations, the channel information module 112 includes a fingerprinting module 220, a matching module 222, and an associating module 224. The methods for determining what TV channel is active on the first TV signal 116 are explained in greater detail herein with reference to FIG. 3. In some implementations, the channel information module 112 includes a security module 225.

The fingerprinting module 220 generates fingerprints from the first TV signal 116 and the second TV signals 118. In some implementations, the fingerprints are any type of condensed or compact representation, or signature, of the content of a video and/or audio signal. In some implementations, fingerprints from the first TV signal 116 and/or the second TV signals 118 are stored for later comparison by the matching module 222. Fingerprints are described in greater detail herein.

The matching module 222 determines whether any of the fingerprints of the first TV signal 116 match any of the fingerprints of the second TV signals 118. In some implementations, the matching module 222 compares the fingerprints of the first and second TV signals to determine whether any of the first fingerprints match any of the second fingerprints. In some implementations, the matching module 222 determines a match between fingerprints (of either the first TV signal or the second TV signals) that are stored in the fingerprint database 120 and fingerprints that are being generated in real-time. In some implementations, the matching module 222 determines a match between first fingerprints and second fingerprints, where both fingerprints are stored in the fingerprint database 120.

The associating module 224 associates meta-information 240 with the first TV signal 116. In some implementations, the associating module 224 acquires or identifies at least a portion of meta-information 240 from internet-based servers or server systems, and stores that data in the meta-information database 126.

Figure 2B:
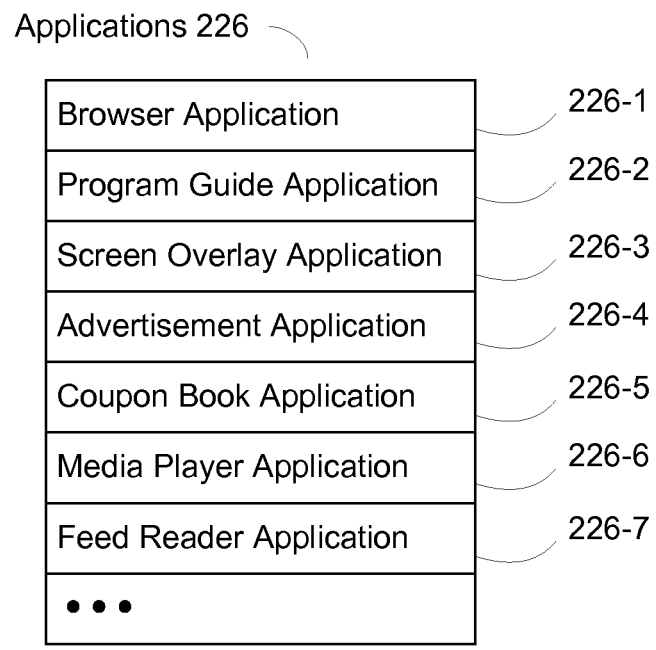
FIG. 2B is a block diagram illustrating further details of FIG. 2A in accordance with some implementations.
Figure 2C:
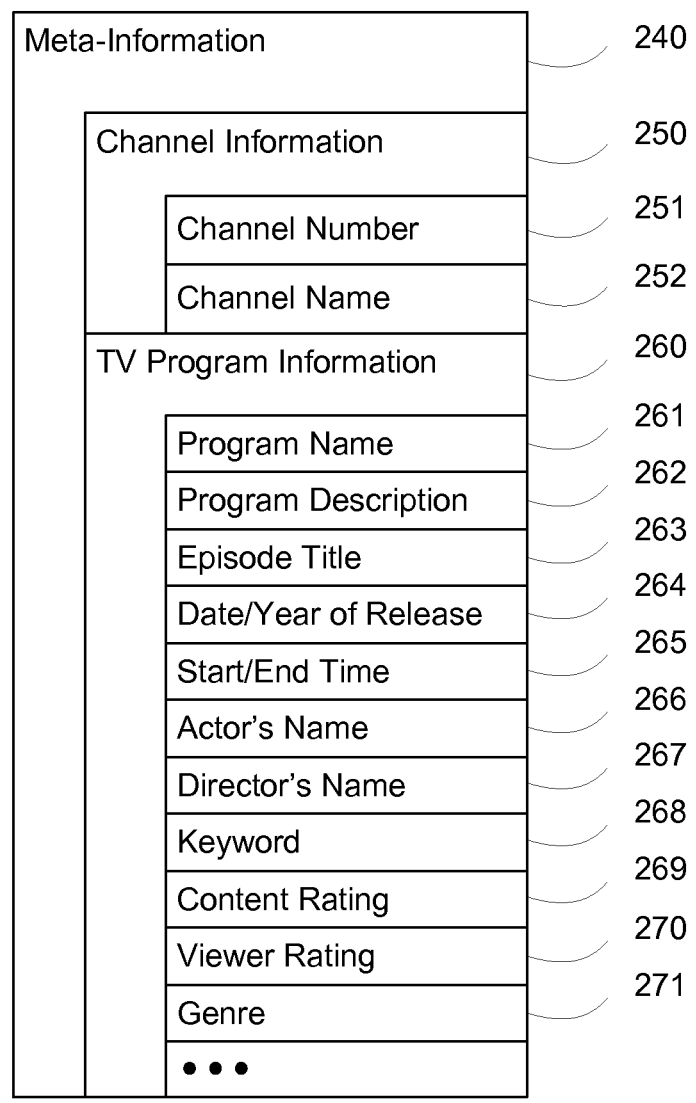
FIG. 2C is a block diagram illustrating further details of FIG. 2A in accordance with some implementations.

FIG. 2C is a block diagram illustrating meta-information 240 according to some implementations. In some implementations, the meta-information 240 includes channel information 250 associated with the first TV signal 116. In some implementations, channel information 250 includes the channel number 251 (e.g., "12") and the channel name 252 (e.g., "NBC") of the first TV signal 116. In some implementations, the meta-information 240 includes TV program information 260 associated with the particular TV program being carried by the TV signal 116 at that time. For instance, in some implementations, the TV program information 260 includes a program name 261, a program description 262, an episode title 263, a date or year of release 264, a start and/or an end time for the program 265, an actor's name 266, a director's name 267, a keyword 268, a content rating 269, a viewer rating 270, a genre 271.

In some implementations, the associating module 224 acquires or identifies the TV program information 260 from internet-based servers or server systems. In some implementations, TV program information 260 is included with the program as metadata. In some implementations, the TV program information 260 is also associated with the first TV signal 116 by the associating module 224. In some implementations, the meta-information 240 for a TV signal, including channel information 250 and TV program information 260, is stored in the meta-information database 126.

In some implementations, the associating module 224 determines what TV program is being viewed by referencing a program guide for the TV channel that is being displayed. For instance, in some implementations, the associating module uses the active TV channel and the time that the channel is being viewed to determine what program is being viewed. Program guides and other references may be located on a server 122 that is accessible via the Internet 124. In some implementations, a program guide 242 is stored in the inline TV processor. As used herein, a TV program can be any type of audio and/or video content, including TV shows, movies, video clips, commercials, TV-based music channels, etc.

As described in more detail herein, in some implementations, a first TV signal 116 corresponds to a previously recorded TV signal, such as a signal from a Digital Video Recorder. Accordingly, the matching module 222 may determine a match between a fingerprint of the previously recorded TV signal and one of the stored second TV signal fingerprints 230. In some implementations, the second TV signal fingerprint 230 has an associated time. For instance, the matching module 222 may determine that a fingerprint of a previously recorded TV signal matches fingerprint T1 232-1 (which is the fingerprint of the 1st channel at time T1). Accordingly, in some implementations, the associating module 224 determines what program was playing on the 1st channel at time T1 by consulting a program guide or other information database that contains historical TV program data. Such databases may be located on the server 122 that is accessible via the Internet 124.

In some implementations, the channel information module 112 includes a security module 225. Because the inline TV processor 108 may determine which TV channels or programs are being displayed to a user, it is sometimes beneficial to provide data security measures to help limit unauthorized access to that information. Accordingly, security module 225 encrypts or otherwise protects the meta-information 240 so that devices other than the inline TV processor 108 cannot access or decipher the channel information. Because most encryption techniques cannot prevent all unauthorized access to the encrypted data, it is understood that the encryption methods in these implementations conform to standard encryption techniques.

The application module 114 includes, and is configured to execute, one or more applications 226-*i*, described with reference to FIG. 2B. In some implementations, the one or more applications 226-*i* include a browser application 226-1, a program guide application 226-2, a screen-overlay application 226-3, an advertisement application 226-4, a coupon book application 226-5, a media player application 226-6, and/or a feed reader application 226-7. In some implementations, the one or more applications 226-*i* receive, and execute in accordance with, the meta-information 240 (including, in some implementations, channel information 250 and/or TV program information 260).

For example, in some implementations, the application module 114 invokes and executes the coupon book application 226-5 to display a coupon to a user based on the meta-information 240 (including, in some implementations, channel information 250 and/or TV program information 260). In some implementations the coupon book application 226-5 stores coupons for later use, either online or at a physical store. In another example, the application module 114 invokes and executes the advertisement application 226-4 to display an advertisement to a user based on the channel being viewed or the specific program that the user is watching. In some implementations, one or more of the applications 226-*i* are downloaded from the server 122 based on the meta-information 240 (including, in some implementations, channel information 250 and/or TV program information 260). In some implementations, downloaded applications are locally stored at the inline TV processor 108.

For example, if a particular channel or TV program is being viewed, an application that is related to that channel or TV program (or an application that is tailored to provide content related to that channel or TV program) may be downloaded for execution by the application module 114. For example, a TV program such as "60 Minutes" may have an application that is configured to display to a viewer additional information about the news stories being reported. In some implementations, an application is automatically downloaded if the inline TV processor 108 determines that a particular TV program is being viewed. In some implementations, an application is downloaded in response to a viewer's selection of the application.

In some implementations, the application module 114 invokes an application 226-*i* and also directs the invoked application 226-*i* to download one or more related digital content items from a remote source, such as the server 122. For example, the application module 114 may invoke a feed reader module to cause the feed reader device to download content items relating to an actor in a show being viewed by a user (such as posts about the actor from an entertainment web site). In another example, the application module 114 may generate instructions to invoke a browser and instructions to cause the browser to navigate to a particular website (e.g., a product website) or a wiki related to the channel or content associated with a program being viewed.

The fingerprint database 112 stores fingerprints of video and/or audio signals. In some implementations, the fingerprint database 112 stores first TV signal fingerprints 228 and second TV signal fingerprints 230. In some implementations, the second TV signal fingerprints 230 include fingerprints for a plurality of individual channels, e.g., 1st channel fingerprints 232 and 2nd channel fingerprints 234. In some implementations, the fingerprint database 112 stores time-coded fingerprints. In some implementations, fingerprints or portions of fingerprints correspond to times T0, T1, . . . , Tn. In some implementations, the fingerprints correspond to channel contents received by the inline TV processor 108 at different times in the past. In some implementations, the fingerprints are stored in the fingerprint database 112 for an extended period of time, ranging anywhere from several minutes to many days. In some implementations, the fingerprints are stored for 1, 5, or 10 days.

As used herein, a fingerprint is any type of condensed or compact representation, or signature, of the content of a video and/or audio signal. In some implementations, a fingerprint may represent several seconds, minutes, or hours of a video or audio signal. Or, a fingerprint may represent a single instant of a video or audio signal (e.g., a single frame of a video). Furthermore, since video content changes over time, corresponding fingerprints of that video content will also change over time.

In some implementations, video and or audio content is fingerprinted using spatial signatures, temporal signatures, color signatures, transform-domain signatures, key frame analysis and/or any other type of fingerprinting method, process, or algorithm (known or developed in the future). In some implementations, a fingerprint is a represented as a fixed-size bit string. In some implementations, a fingerprint is represented as cryptographic hash value generated by a cryptographic hash function. In some implementations, a fingerprint is represented by a single vector that summarizes several multidimensional vector sequences of audio or video content.

In some TV systems, TV signals from a first source 102 may either lead or lag TV signals from a second source 104. This may occur, for example, when a first source 102 is a high-definition cable TV source, and the second source 104 is a standard-definition, over-the-air TV broadcast. Thus, the inline TV processor 108 may determine signal latency value(s) 236 between the first source 102 (or the first TV signal 116) and the second source 104 (or one or more of the second TV signals 118). The signal latency value(s) 236 represent the time lag (or lead) between the first TV signal 116 and the second TV signals 118. The signal latency value(s) 236 can then be stored, and can be used by the channel information module 112 to aid in the comparing and matching of fingerprints. In some implementations, signal latency value(s) 236 are stored for each of the second TV signals 118, as the signal latency between the TV sources may be different for each channel. In some implementations, the inline TV processor 108 determines the signal latency value(s) 236. In some implementations, the inline TV processor 108 acquires the signal latency value(s) 236 from some other source that compiles, provides, and/or stores such information, such as from a server 122.

Many modern cable and satellite receivers allow users to pause TV signals. If a user pauses and then resumes a program from a first source 102 (e.g., a cable TV signal from a set-top-box), the signal latency between the first source 102 (or the first TV signal 116) and the second source 104 (or one or more of the second TV signals 118) may be changed. Thus, in some implementations, the signal latency value(s) 236 include (or are modified in accordance with) a pause time 237 corresponding to the amount of time that a TV signal was paused by a viewer. For example, if a user pauses a TV show from a first source 102 for three minutes, the first TV signal 116 would likely lag the second TV signal that corresponds to the first TV signal 116 by about three minutes. Accordingly, the pause time 237 will reflect this three minute difference. Furthermore, the pause time 237 is sometimes combined with any other latency values inherent in the first and second TV signals. To account for the effects of pausing a first TV signal 116, the inline TV processor 108 may monitor the duration that a first TV signal 116 is paused, and store that duration in the pause time 237.

The channel information module 112 stores the meta-information 240 that has been associated with the first TV signal 116 by the associating module 224 in the meta-information database 126. Meta-information 240 is described in greater detail above with reference to FIG. 2C.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures, or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Although FIG. 2A shows a single inline TV processor device, FIG. 2A is intended more as functional description of the various features which may be present in a set of devices than as a structural schematic of the implementations described herein. In practice, and as recognized by those of ordinary skill in the art, items shown separately could be combined and some items could be separated. For example, some items (e.g., operating system 214 and network communication module 216) shown separately in FIG. 2A could be implemented on single devices and single items could be implemented by one or more devices. The actual number of devices used to implement the inline TV processor 108, and how features are allocated among them, will vary from one implementation to another.

Figure 3:
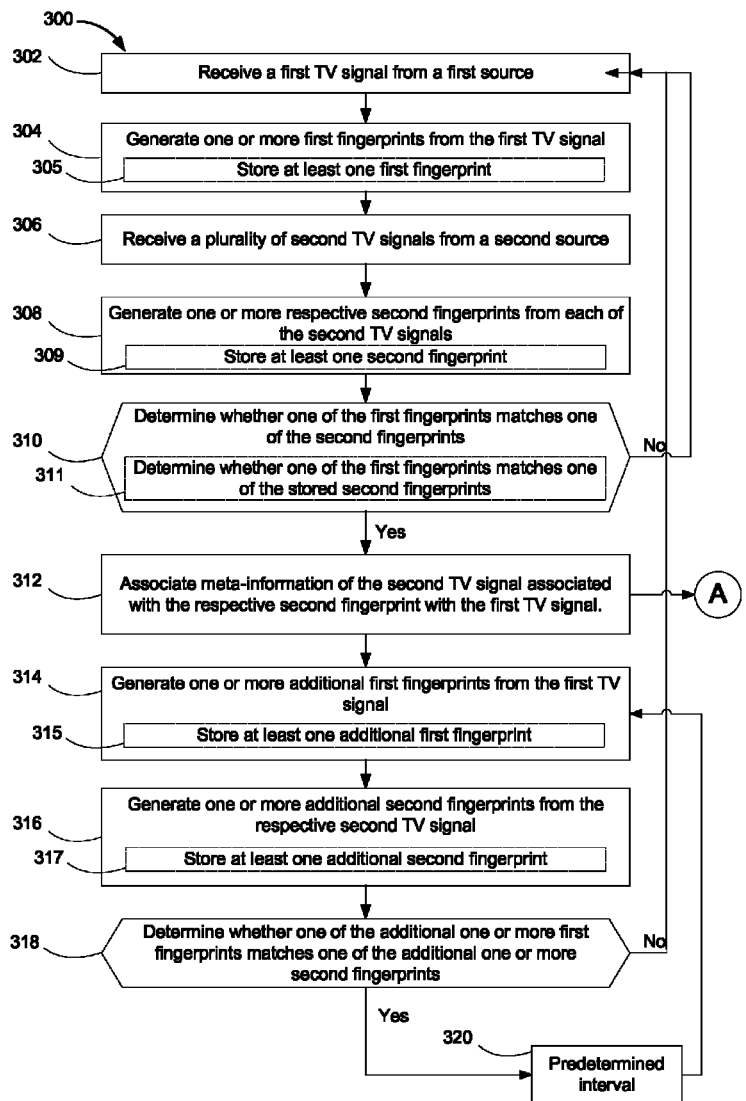
FIG. 3 is a flow chart illustrating an overview of the process of detecting a channel being displayed by a TV signal, in accordance with some implementations.

Attention is now directed to FIG. 3, which is a flow diagram illustrating a process 300 of detecting the channel of a first TV signal based on matching a fingerprint of the first TV signal with a fingerprint of second TV signals, according to some implementations. Such methods may be useful for content providers desiring to provide content that is tailored to the specific channel being viewed by a user.

The method 300 is performed at an inline TV processor 108 having one or more processors and memory. In some implementations, the method 300 is performed by the channel information module 112. A first TV signal is received (302) from a first source. In some implementations, the first TV signal corresponds to a TV signal that is being displayed to a user. For example, the first TV signal is sometimes the same signal that is ultimately received by a TV, displayed by the TV, and viewed by a user. In some implementations, the first TV signal corresponds to a TV signal that is being recorded by a recording device that is part of the TV system, such as a digital video recorder. In some implementations, the first TV signal is or includes an audible stream corresponding to the audio channel component of a concurrently displayed TV video signal, where the audible stream is being emitted by speakers (e.g., the speakers on a TV). The audible stream is received by the first source receiver 210, where the first source receiver 210 is a microphone, transducer, and/or an audio-pickup device.

The channel information module generates (304) one or more first fingerprints from the first TV signal (e.g., with the fingerprinting module 220). In some implementations, at least one of the first fingerprints is stored (305) in the fingerprint database 112. In some implementations, each first fingerprint that is generated according to these implementations is stored in the fingerprint database 112. As noted above, the first fingerprints can be generated for video components of a TV signal, audio components of a TV signal, or both. Furthermore, in some implementations, the fingerprint is generated from the audible stream received by the microphone, transducer, and/or audio-pickup device of the inline TV processor.

The channel information module receives (306) a plurality of second TV signals from a second source (e.g., second source receiver 212). The plurality of second TV signals corresponds to a plurality of TV channels. In some implementations, each of the second TV signals corresponds to a TV channel.

The channel information module generates (308) one or more respective second fingerprints from each of the second TV signals (e.g., with the fingerprinting module 220). In some implementations, at least one of the second fingerprints is stored (309) in the fingerprint database 112. In some implementations, each second fingerprint that is generated according to these implementations is stored in the fingerprint database 112. As noted above, the second fingerprints can be generated for video signals, audio signals, or both.

It is determined (310) whether one of the first fingerprints matches one of the second fingerprints (e.g., with the matching module 222). In accordance with a determination that the first fingerprint does not match any of the second fingerprints (310, No), the method returns to step (302). In some implementations, the channel information module determines whether one of the first fingerprints matches one of the second fingerprints approximately every 5 seconds. In other words, it takes approximately 5 seconds for the first fingerprint to be checked against all of the second fingerprints to determine whether there is a match. In some implementations, the channel information module determines whether one of the first fingerprints matches one of the second fingerprints approximately every 60 seconds. However, this time may increase or decrease depending on many factors, including the number of second fingerprints, the speed of the CPU(s) 202 of the inline TV processor 108, and/or the type of fingerprinting used. In some implementations, it may be advantageous to minimize the time it takes to compare the first and second fingerprints. In some implementations, the methods described herein are performed on parallel-processing computer systems, where the first fingerprint is compared individually to each of the second fingerprints in parallel.

In some implementations, the channel information module may use the signal latency value(s) 236 to ensure that the appropriate first and second fingerprints, or portions of those fingerprints, are compared. For example, if the inline TV processor 108 determines that the second TV signals 118 deliver TV channels (or any individual TV channel) two seconds ahead of the first TV signal 116, then the inline TV processor may compare the first fingerprint to second fingerprints (or portions of second fingerprints) that have been delayed for two seconds. In some implementations, the signal latency value(s) 236 correspond only to an approximate signal lag between the first and second TV signals, and are used by the inline TV processor 108 to identify a set of candidate fingerprints for comparison based on a span of time near the signal latency value(s) 236. For example, if a signal latency value indicates that a second TV signal 118 delivers a certain TV channel five seconds ahead of the first TV signal 116, the inline TV processor may first focus its comparison between the fingerprints to second TV signal fingerprints that are between 3 and 7 seconds old. In some implementations, the signal latency value(s) 236 correspond to minimum (or maximum) delay times between TV signals, so that the inline TV processor 108 only compares fingerprints that are older (or newer) than the signal latency value(s) 236.

In some implementations, in order to determine a pause time 237 associated with a first TV signal 116, the inline TV processor 108 determines whether a first TV signal 116 is displaying a static image rather than a video stream. When a TV signal is paused by a user, a single frame of the video stream may be displayed on a display device 106, indicating that the TV signal 116 has been paused. The inline TV processor 108 may monitor for this condition, for example, by monitoring the first fingerprint to determine whether the video is displaying a moving or a static picture. In some implementations, when the first fingerprint does not change for a predefined threshold of time, the inline TV processor 108 determines that the first TV signal 116 has been paused. In accordance with a determination that the first TV signal 116 has been paused, the inline TV processor 108 continues to monitor the first fingerprint until it determines that the first TV signal 116 has resumed playback. The inline TV processor 108 then monitors the duration that the first TV signal 116 is paused in order to incorporate that value into the signal latency value(s) 236, as described in greater detail above.

In some implementations, the channel information module determines (311) whether one of the first fingerprints match one of the stored second fingerprints (e.g., with the matching module 222). In some implementations, fingerprints generated (308) for each of the second TV signals 118 are stored in the fingerprint database 112. Thus, the fingerprints of the second TV signals 118 will be available so that if the first TV signal 116 is delayed (due to a user pausing the first source 102, for example), the stored second fingerprints are available to be compared to fingerprints of the now delayed first TV signal 116.

In some implementations, the inline TV processor 108 stores fingerprints generated for each of the second TV signals 118 for a duration sufficient to account for a user recording the first TV signal 116 for later viewing (e.g., in the fingerprint database 112). For example, a user may record a TV program on a digital video recorder, to be viewed at a later time or date. Accordingly, it may be beneficial to store second fingerprints for up to several days, weeks, or months, so that the channel information module 112 can match fingerprints of a first TV signal 116 to the stored second fingerprints. In some implementations, the channel information module compares the first fingerprints to a subset of stored second fingerprints in order to determine a match. In some implementations, the inline TV processor 108 stores archived meta-information 241 associated with each of the stored second fingerprints, so the archived meta-information 241 can be associated with a first TV signal 116 that is determined to match a stored second fingerprint. The archived meta-information 241 for each channel corresponding to one of the stored second fingerprints (e.g., 1st channel meta-information 241-1, 2nd channel meta-information 241-2) contains at least a subset of the data shown in meta-information 240, as described above with reference to FIG. 2C. In some implementations, the inline TV processor 108 consults a program guide or other information database that contains historical TV program data to determine what TV program was playing at that time. Such databases may be located on the server 122 that is accessible via the Internet 124.

Returning to step (310), in accordance with a determination that one of the first fingerprints does match a respective one of the second fingerprints associated with a respective second TV signal (310, Yes), the channel information module associates (312) meta-information of the respective second TV signal (that is associated with the respective second fingerprint) with the first TV signal (e.g., with the associating module 224). For example, if a first TV signal 116 is found to match one of the second TV signals 118, the meta-information of the respective second TV signal is determined to be the same as the meta-information of the first TV signal 116. The meta-information associated with the first TV signal 116 can then be acquired or identified, and stored in the meta-information database 126 as meta-information 240. In some implementations, the inline TV processor 108 provides a portion of the meta-information 240 (such as the channel number 251) associated with the first TV signal 116 to applications that use the information to customize displayed content based on the particular channel that a user is viewing.

In some implementations, the inline TV processor identifies the channel number for the respective second TV signal (that was determined to match the first TV signal) with the second source receiver 212. In some implementations, the second source receiver 212 is a tuner for receiving over-the-air broadcast TV signals, cable TV signals, internet TV signals, and/or other TV signals. A tuner may be configured to focus on certain frequencies (or frequency ranges) that correspond to particular TV channels, such that the tuner correlates a received TV signal with a particular frequency, and therefore with a channel number. Accordingly, the tuner correlates a channel number with a second TV signal, which can then be associated with the matching first TV signal as part of meta-information 240.

In some implementations, the channel information module 112 identifies channel information for the second TV signals in addition to that identified by the second source receiver 212. For example, once the channels corresponding to the second TV signals are identified by a tuner, the channel information module 112 may fetch meta-information from a server 122, such as information about the TV programs being aired on that channel at specific times. The channel information module 112 may store meta-information for each respective channel carried by the second TV signals 118 as archived meta-information 241 in the meta-information database 126, so the archived meta-information 241 can be associated with a first TV signal 116.

Some TV signals may also include meta-information in the actual TV signal. For example, a channel number or channel name may be embedded in the TV signal. In some implementations, additional or alternative channel information is embedded in the TV signal as well, including any of a program name, a program description, an episode title, a date or year of release, a start and/or an end time for the program, an actor's name, a director's name, a keyword, a content rating, a viewer rating, a genre, etc.

At steps (314)-(318), the inline TV processor 108 cyclically determines whether the first and second TV signals no longer match. The lack of a match may occur, for example, when the channel of the first source 102 has been changed, or when the user switches to or from a recorded TV signal, e.g., from a Digital Video Recorder.

The channel information module generates (314) one or more additional first fingerprints from the first TV signal (e.g., with the fingerprinting module 220). In some implementations, at least one of the additional first fingerprints is stored (315) in the fingerprint database 112.

The channel information module generates (316) one or more additional second fingerprints from the respective second TV signal (e.g., with the fingerprinting module 220). In some implementations, at least one of the additional second fingerprints is stored (317) in the fingerprint database 112.

The first TV signal at step (314) corresponds to the active (i.e., currently viewed) first TV signal, and the respective second TV signal at step (316) corresponds to the respective second TV signal. In other words, the respective second fingerprint is a fingerprint corresponding to the second TV signal that was previously determined to match the first TV signal at step (310).

It is determined (318) whether one of the additional first fingerprints matches one of the additional second fingerprints (e.g., with the matching module 222). In accordance with a determination that the fingerprints, and hence the TV signals, match (318, Yes) the channel information module returns to step (314). In some implementations, the channel information module determines whether an additional first fingerprint matches an additional second fingerprint (steps 314-318) at a predetermined interval 320. For example, after an initial match has been found (318, Yes), the channel information module may repeat the steps (314)-(318) approximately every five seconds. In some implementations, the steps are repeated approximately every 1 second. In some implementations, the steps are repeated approximately every 0.1 second. In some implementations, the steps are repeated more or less frequently.

In accordance with a determination that the first fingerprint does not match the respective second fingerprint (318, No), the channel information module returns to step (302).

Figure 4:
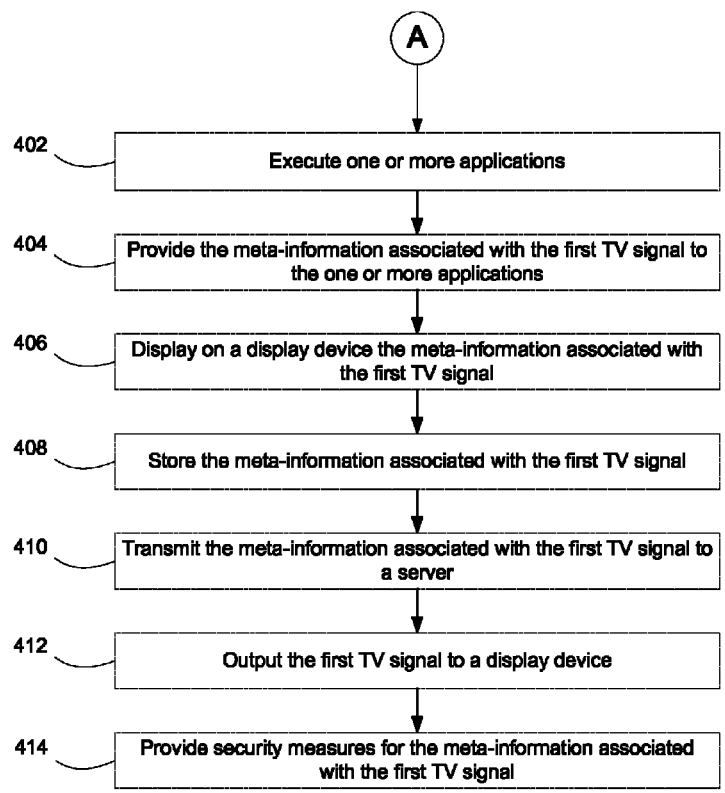
FIG. 4 is a flow chart illustrating additional processes of the inline TV processor, in accordance with some implementations.

Attention is now directed to FIG. 4, which illustrates additional aspects of the method 300. In some implementations, the application module 114 executes (402) one or more applications (or application instructions). In some implementations, the channel information module 112 provides (404) the meta-information associated with the first TV signal to the one or more applications.

In some implementations, the inline TV processor 108 displays (406), on a display device, the meta-information associated with the first TV signal 116. For example, in some implementations, the application module 114 executes an application that generates a screen overlay for display on a display device. The screen-overlay is sometimes configured to display the meta-information associated with the first TV signal 116. For example, the screen overlay sometimes includes text and/or images that are being displayed, and provides information about the TV channel or program that is being displayed. The information can include the channel number and TV program information, as described in greater detail above with reference to FIGS. 1-3.

In some implementations, the associating module 224 stores (408) the meta-information associated with the first TV signal, e.g., in the meta-information database 126. In some implementations, the meta-information associated with the first TV signal is transmitted (410) to a server. In some implementations, the meta-information is transmitted (410) to a server so that viewing trends can be compiled and/or analyzed.

In some implementations, the inline TV processor 108 outputs (412) the first TV signal to a display device. For example, the inline TV processor 108 has audio/video inputs and outputs 213. In some implementations, the inline TV processor 108 has an input for receiving the first TV signal 116, and an output for transmitting the first TV signal to a display device. In some implementations, the input and output for the first TV signal are HDMI connectors. In some implementations, the input and output for the first TV signal are coaxial connectors. In some implementations, the signal that is output to the display device includes other audio and/or video information in addition to the TV program. For example, the output sometimes includes information that causes the display device to display other information (such as program information in a screen overlay) as well as the TV programming from the first TV signal.

In some implementations, the security module 225 provides (414) security measures for the meta-information associated with the first TV signal. For example, some implementations provide for the meta-information to be encrypted according to known data encryption techniques.

Each of the methods described herein may be governed by instructions that are stored in a non-transitory computer readable storage medium and that are executed by one or more processors of one or more electronic devices (e.g., inline TV processor 108). Each of the operations shown in FIGS. 3 and 4 may correspond to instructions stored in a computer memory or computer readable storage medium.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

What is claimed is:

1. A computer-implemented method of determining meta-information for a channel, comprising:

at an inline TV processor with a processor, memory, a video input, and a tuner, wherein the inline TV processor is local:

receiving, using the video input, a first TV signal from a first source, wherein program identification information associated with the first TV signal is not available to the inline TV processor, and wherein the first TV signal is a broadcast TV signal;

generating one or more first fingerprints from the first TV signal;

receiving, using the tuner, a plurality of second TV signals from a second source, wherein program identification information associated with a respective signal in the plurality of second TV signals is available to the inline TV processor;

generating one or more respective second fingerprints for each of the second TV signals;

determining a signal latency value between the first TV signal and each of the plurality of second TV signals;

determining whether one of the first fingerprints matches any of the second fingerprints using the signal latency value;

in accordance with a determination that one of the first fingerprints matches a respective one of the second fingerprints, associating, with the first TV signal, program identification information identified from a second TV signal having the respective second fingerprint; and outputting for display the first TV signal and the program identification information identified from the second TV signal.

2. A system for determining meta-information for a channel, comprising:
- a processor;
- memory;
- a video input;
- a tuner; and
- one or more programs for execution by the processor, the one or more programs comprising instructions for:
  - receiving, using the video input, a first TV signal from a first source, wherein program identification information associated with the first TV signal is not available to the inline TV processor, and wherein the first TV signal is a broadcast TV signal;
  - generating one or more first fingerprints from the first TV signal;
  - receiving, using the tuner, a plurality of second TV signals from a second source, wherein program identification information associated with a respective signal in the plurality of second TV signals is available to the inline TV processor;
  - generating one or more respective second fingerprints for each of the second TV signals;
  - determining a signal latency value between the first TV signal and each of the plurality of second TV signals;
  - determining whether one of the first fingerprints matches any of the second fingerprints using the signal latency value;
  - in accordance with a determination that one of the first fingerprints matches a respective one of the second fingerprints,
    - associating, with the first TV signal, program identification information identified from a second TV signal having the respective second fingerprint; and
    - outputting for display (i) the first TV signal and (ii) the program identification information identified from the second TV signal.

3. The system of claim 2, wherein the plurality of second TV signals is over-the-air signals.

4. The system of claim 2, wherein the inline TV processor is connected to the first source with one of: an HDMI cable, a coaxial cable, a VGA cable, an optical cable, and a wireless connection.

5. The system of claim 2, wherein the program identification information comprises a channel number.

6. The system of claim 2, wherein the program identification information is one of: a program name, a program description, an episode title, a date or year of release, a start and/or an end time for the program, an actor's name, a director's name, a keyword, a content rating, a viewer rating, and a genre.

7. A non-transitory computer readable storage medium storing one or more programs configured to be executed by an electronic device that includes one or more processors, a video input, and a tuner, wherein the one or more programs comprise instructions for:
- receiving, using the video input, a first TV signal from a first source, wherein program identification information associated with the first TV signal is not available to the inline TV processor, and wherein the first TV signal is a broadcast TV signal;
- generating one or more first fingerprints from the first TV signal;
- receiving, using the tuner, a plurality of second TV signals from a second source, wherein program identification information associated with a respective signal in the plurality of second TV signals is available to the inline TV processor;
- generating one or more respective second fingerprints for each of the second TV signals;
- determining a signal latency value between the first TV signal and each of the plurality of second TV signals;
- determining whether one of the first fingerprints matches any of the second fingerprints using the signal latency value;
- in accordance with a determination that one of the first fingerprints matches a respective one of the second fingerprints,
  - associating, with the first TV signal, program identification information identified from a second TV signal having the respective second fingerprint; and
  - outputting for display the first TV signal and the program identification information identified from the second TV signal.

8. The system of claim 2, wherein
(i) the second TV signal from which the program identification information is identified, and
(ii) the first signal
correspond to a same TV program.

9. The system of claim 2, further comprising:
- tracking an amount of time that the first TV signal was paused by a viewer while the viewer is watching the first TV signal; and
- associating the signal latency value to the pause time.

10. The system of claim 2, further comprising:
- providing a security measure to limit unauthorized access to the program identification information associated with the first TV signal.

11. The system of claim 2, further comprising:
- executing one or more applications based on the program identification information associated with the first TV signal, wherein the one or more applications are locally stored at the inline TV processor.

* * * * *